(12) United States Patent
Lohmann

(10) Patent No.: US 8,520,221 B2
(45) Date of Patent: Aug. 27, 2013

(54) OPTICAL SENSOR

(75) Inventor: Lutz Lohmann, Olching (DE)

(73) Assignee: Leuze Electronic GmbH + Co. KG, Owen/Teck (DE)

( * ) Notice: Subject to any disclaimer, the term of this patent is extended or adjusted under 35 U.S.C. 154(b) by 278 days.

(21) Appl. No.: 13/111,427

(22) Filed: May 19, 2011

(65) Prior Publication Data

US 2011/0286009 A1    Nov. 24, 2011

(30) Foreign Application Priority Data

May 20, 2010    (DE) .......................... 10 2010 022 159

(51) Int. Cl.
*G01B 11/14*    (2006.01)
(52) U.S. Cl.
USPC ........................................................ 356/614
(58) Field of Classification Search
USPC ................ 356/614; 250/353, 559.29, 559.32
See application file for complete search history.

(56) References Cited

U.S. PATENT DOCUMENTS

| | | | | |
|---|---|---|---|---|
| 6,211,522 | B1 * | 4/2001 | Kotlicki et al. ............... | 250/353 |
| 6,469,625 | B1 * | 10/2002 | Tomooka ...................... | 340/556 |
| 6,653,635 | B2 * | 11/2003 | Liao et al. ..................... | 250/353 |
| 8,408,736 | B2 * | 4/2013 | Chien ............................ | 362/235 |
| 2005/0030180 | A1 * | 2/2005 | Pantus et al. .................. | 340/556 |
| 2006/0038680 | A1 * | 2/2006 | Eskildsen et al. ............. | 340/567 |
| 2010/0077421 | A1 * | 3/2010 | Cohen et al. ................... | 725/10 |

FOREIGN PATENT DOCUMENTS

DE        103 26 848  A1      1/2005

* cited by examiner

*Primary Examiner* — Roy M Punnoose
(74) *Attorney, Agent, or Firm* — Venable LLP; Robert Kinberg

(57) ABSTRACT

An optical sensor apparatus to detect objects within a monitored region includes a housing having a window. A sensor includes a transmitting/receiving unit arranged inside the housing and rotatable around an axis. The transmitting/receiving unit includes a transmitter to emit light rays and a receiver to receive light rays. The transmitted light rays and the received light rays are conducted through the window in the housing. The window is optically adapted to shape the transmitted light rays and the received light rays into beams.

20 Claims, 5 Drawing Sheets

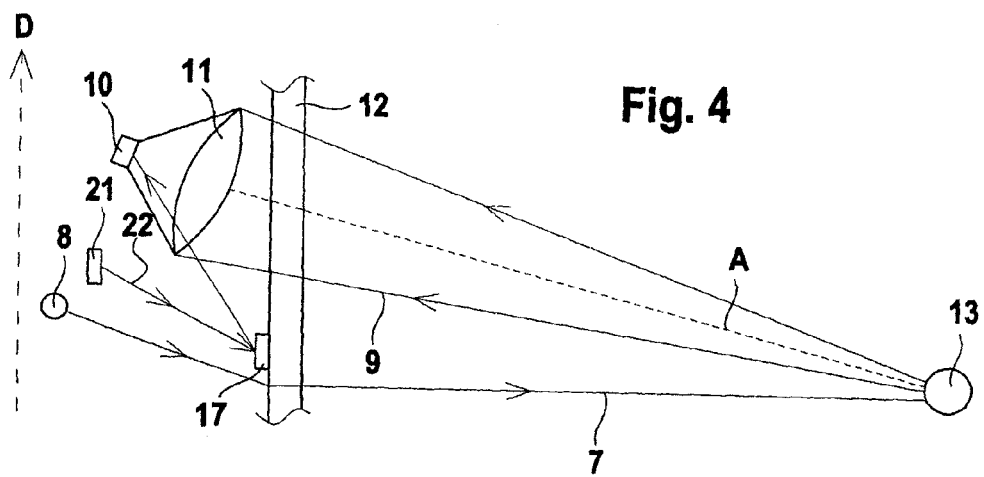
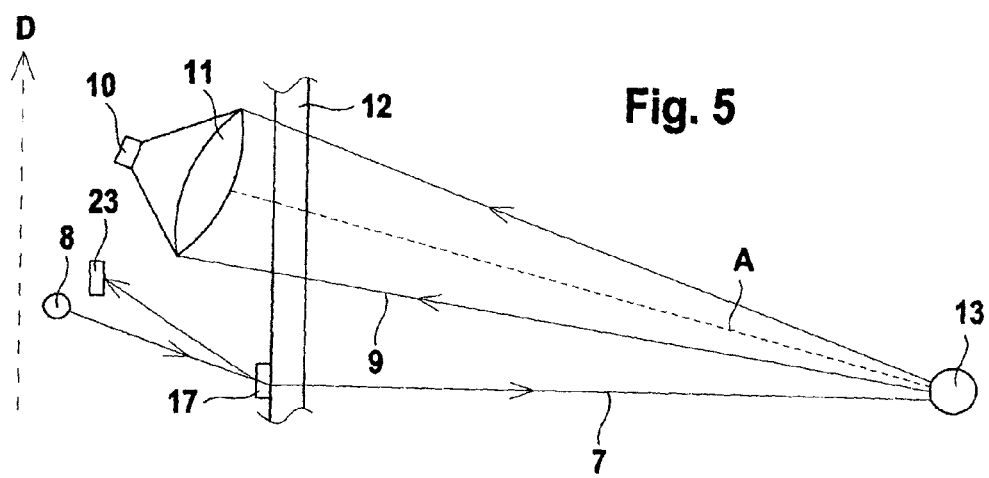

OPTICAL SENSOR

CROSS-REFERENCE TO RELATED APPLICATION

This application claims the priority of German Patent Application DE 10 2010 022 159.7, filed on May 20, 2010, the subject matter of which is incorporated herein by reference.

BACKGROUND OF THE INVENTION

The invention relates to an optical sensor.

Optical sensors of this type are generally used for detecting objects within a monitored area. In particular, these optical sensors are used for the technical equipment employed in security systems for which the area monitored with the optical sensor represents a danger zone of the system, for example a machine, a working tool, a robot or the like.

Optical sensors used for such monitoring tasks in particular can be embodied as area distance sensor. An area distance sensor of this type is known, for example, from the German patent document DE 103 26 848 A1. The sensor described in this document is used for detecting objects in a monitored area and is provided with a transmitter for emitting light rays, a receiver with thereto assigned receiving optics for receiving light rays which has a specified field of view that is admitted by the receiving light rays, and a deflection unit for the periodic deflection of the transmitted light rays within a specified angular range that defines the monitored area. An object-detection signal is generated at the receiver output of an evaluation unit, in dependence on the receiving signals. A short-range optics is arranged in the field of view for the receiving optics, wherein the segment of the field of view of the receiving optics which is covered by the short-range optics can be adjusted with the aid of an adjustment unit.

Sensors of this type are generally configured such that the transmitter and the receiver are installed immovably at a location, meaning they are arranged stationary. For conducting the transmitted light rays within a flat area to be monitored, the deflection unit is the only rotating and thus movable part of the optical sensors which are integrated into a housing. The deflection unit typically consists of at least one motor-driven mirror for deflecting the transmitted light rays and preferably also the received light rays.

However, one disadvantage of area distance sensors of this type is that they require a large amount of space for the deflection unit, so that the area distance sensor on the whole has an undesirably large structural form.

A further disadvantage is the extremely long path traveled by the transmitted light rays that extends from the transmitter via the deflection unit to a window in the housing through which the transmitted light rays leave the optical sensor. The same is true for the receiving light rays which enter the housing via the window in the housing and are deflected via the deflection unit to the receiver, thereby resulting in internal reflections of the transmitted light rays and the receiving light rays within the housing, which consequently reduce the detection sensitivity of the optical sensor.

A further disadvantage is that the deflection unit, which deflects the transmitted light rays and the receiving light rays, is normally tilted relative to the beam axes for the transmitted light rays and the receiving light rays, so that the cross sections of the transmitted light rays and the receiving light rays are deformed during the reflection at the deflection unit. This change in the beam cross section also causes a reduction in the detection sensitivity of the optical sensor.

SUMMARY OF THE INVENTION

It is an object of the present invention to provide an optical sensor of the aforementioned type which has a higher functionality along with the simplest possible design.

The above and other objects are accomplished according to an embodiment of the invention wherein there is provided an optical sensor apparatus to detect objects within a monitored region, comprising: a housing including a window; a sensor including a transmitting/receiving unit arranged inside the housing and being rotatable around an axis, the transmitting/receiving unit comprising a transmitter to emit light rays and a receiver to receive light rays, wherein the transmitted light rays and the received light rays are conducted through the window in the housing, and the window is optically adapted to shape the transmitted light rays and the received light rays into beams.

The rotating transmitting/receiving unit with the transmitter and receiver may be moved close to the window which is positioned in the housing. The path traveled by the transmitted light rays and the received light rays between the transmitting/receiving unit and the window, which is not protected by a tube or the like, can therefore be extremely short, so as to avoid nearly all losses caused by internal reflections of the transmitted light beam and the received light beam inside the housing. A separate deflection unit therefore can be omitted. As a result, the structural size of the optical sensor can be reduced considerably, thus also avoiding undesirable deformations of the beam cross sections for the transmitted light beam and the received light beam which would occur with a reflection on a deflection unit.

This embodiment also avoids an undesirable shading of the receiver caused by transmitter components, such as is the case for a system with a deflection unit.

Another advantage is that the window in the housing, which can form a separate part or can be embodied integrally with the housing, can itself have optical properties. In principle, it is also possible to provide separate windows through which the transmitting/receiving light rays can pass. On the one hand, separate optical elements for the shaping of beams with the transmitted light rays and/or the received light rays can have a simpler design or can even be omitted. Further, the path traveled by the transmitted and/or the received light rays inside the housing can be optimized, so as to avoid light-beam losses or direct back scattering of the transmitted light rays into the receiver. Owing to the optical effect of the window in the housing, the beam guidance for the transmitted light rays and the receiving light rays outside of the housing can furthermore be optimized separately with respect to the highest possible detection sensitivity.

With a suitable selection of the window material, it is furthermore possible to achieve a band pass filtering effect as a further optical property, such that the window is essentially permeable to the wavelengths of the transmitted light rays, but filters out interfering light at other wavelengths.

The transmitting/receiving unit may form a distance sensor which operates based on the light-transit time method. The transmitter may emit light rays in the form of light pulses for which the transit time to an object to be detected is recorded in an evaluation unit.

The position of objects in the monitored area can be determined with the aid of the distance measurements which are carried out, wherein the position of an object is determined from the respectively detected distance value for the distance measurement and the momentary rotational position of the transmitting/receiving unit which is determined with a suitable transducer. Depending on the embodiment of the window, the monitored area inside of which the object is detected can extend over a region covered by an angular range of 360° or only over a section thereof.

The optical sensor according to the invention is configured such that the transmitting/receiving component forms a part of a rotating measuring head which is arranged inside of the stationary housing.

The transmitting/receiving unit that is integrated into the measuring head is advantageously embodied such that the transmitter and/or a transmitting optics assigned thereto is or are positioned at an axial offset relative to the receiver and/or a receiving optics assigned thereto.

With this offset arrangement only the receiving light rays that are reflected back by an object positioned at far range will essentially travel back along the optical axis of the receiving optics and impinge on the receiving optics, thereby causing the receiving optics to function at an optimum level because the receiving light rays are captured completely by the receiving optics. In contrast, when detecting an object at close range, a desired loss of adjustment of the receiving optics is achieved in that the direction at which the receiving light rays impinge does not coincide with the optical axis, meaning there results an incomplete capture of the receiving light rays by the receiving optics. In this way, the amplitude of the receiving signals during the detection of objects at close range can be delimited and reduced, thus avoiding an otherwise occurring overdrive of the receiver. No expensive electronic components, e.g. logarithmic amplifiers, are therefore needed to electronically delimit the receiving signals.

Owing to the fact that the transmitting and the receiving optics are arranged offset, relative to each other, the dynamic of the receiving signals, meaning the variation range of the receiving amplitudes within the total distance to be covered and the range of reflectivity for the objects to be detected, can be delimited easily for the optical sensor according to the invention. Not only is it possible in this way to use a receiver with a simpler design, but the requirements to be met by the electronic components for evaluating the received signals can be reduced in this way, thereby resulting in a further cost reduction.

According to another embodiment, the transmitted light beams may be divided into a main beam and satellite beams which are uncoupled from the main beam and extend at different angles thereto. Whereas far-range objects can be detected particularly effectively with the main beam, the satellite beams may be used to detect objects at close range. The angles of inclination for these satellite beams to the main beam are suitably selected to be different in that case, wherein the main beam and the satellite beams are either conducted through the same window or through separate windows. This type of embodiment is particularly suitable for a transmitting/receiving unit which functions as a distance sensor that operates based on the pulse-transit time method since the transmitted light rays are emitted as light pulses. The evaluation unit may be embodied such that it can detect individually and time resolved several receiving light pulses stemming from a transmitted light pulse which, corresponding to the division into a main beam and several satellite beams, are reflected by objects at different distances and arrive at different points in time at the receiver.

According to another embodiment the transmitting optics and/or the receiving optics may be a rotating optics or may be embodied as such.

In a further embodiment, the transmitting optics and the receiving optics may be combined into a single optical component which results in a compact and cost-effective design.

The optical sensor according to the invention may be utilized in the area of safety technology, for example, for the protection of persons. Embodiments of the optical sensor may comprise a redundant signal evaluation which take the form of a two-channel evaluation unit.

To achieve the required safety level for distance measurements realized with the transmitting/receiving unit, a reference object may be arranged on the window to serve as a target for reference measurements designed to test the function of the transmitting/receiving unit.

With the aid of the reference measurements that are carried out and which may include at least one amplitude measurement and one distance measurement, it is possible to check whether or not the transmitting/receiving unit operates error-free.

According to one advantageous embodiment, the reference object may be a partially transparent object. To realize the reference measurements, a share of the light rays emitted by the transmitter may be reflected back onto the receiver of the transmitting/receiving unit.

For this case, the transmitting/receiving unit itself may be used to test an error-free operation.

An alternative technique for realizing the reference measurements makes use of an additional transmitting element for which the light rays are conducted from the reference object to the receiver, wherein the additional transmitting element may be a component of the measuring head. The additional transmitting element in this case may form an additional optical element for checking the receiver.

However, the reference measurements may also be realized in the same way by providing an additional receiving element onto which the light rays emitted by the transmitter and the light rays reflected back by the reference object may be conducted. The additional receiving element forms a component of the measuring head. The additional receiving element for this case may form an additional optical element for testing the transmitter.

Reference measurements in the form of amplitude measurements may be realized with the additional optical elements whereas reference measurements in the form of distance measurements may be realized with the aid of the transmitter and the receiver of the transmitting/receiving unit.

A reference object, for example embodied in the form of a grid structure, may be arranged on the inside of the housing so that reference measurements may be recorded once during each rotation of the measuring head. The reference object may be at least partially transparent for this, so that only a small share of the light rays emitted by the transmitter may be reflected back by the reference object for realizing the reference measurements while the largest share of the transmitted light rays may be conducted through the housing into the monitored area and can thus be utilized for the object detections.

According to a further embodiment, a sensor element for monitoring the window may be integrated into the measuring head. The light rays emitted by this sensor element may be conducted through the window onto a reflector, mounted on the housing, and then conducted back through the window to the sensor element. The window monitoring thus meets an additional safety-relevant monitoring function since a dirty window can reduce the detection safety of the optical sensor.

The sensor element used for the window monitoring may rotate along with the transmitting/receiving unit which carries out the detection of the object and, during the course of one rotation of the measuring head, checks the window over its complete circumference, thereby making it unnecessary to have sensors distributed over the complete circumference.

According to another embodiment of the invention, electronic components are integrated into the measuring head for the control and/or evaluation of signals from the transmitting/receiving units. The electronic components integrated into the measuring head may be used for signal pre-processing, including for the suppression of error signals caused by dirt deposits on the window.

As a result of this signal pre-processing in the measuring head, the amount of data can be reduced considerably, so that only a manageable amount of data must be transferred to the stationary evaluation unit in which the final evaluation takes place.

According to a further embodiment, a secure or a non-secure, contactless energy and/or data transfer may take place between the rotating measuring head and a stationary component of the optical sensor.

A transfer between stationary and rotating components of the optical sensor is thus made possible, using components which are not subject to wear and tear.

A further embodiment of the invention provides that the optical sensor comprises a device for visualizing the transmitted light rays.

The device can be used, for example, to visualize the path of the transmitted light rays in the monitored area and/or the location where the transmitted light rays impinge on an object. The respective region can be displayed by activating a light transmitting element that rotates along in the measuring head and activates a visible light beam. Alternatively, a visible light spot on the window or a reflecting ring installed in this region can also be imaged.

According to another embodiment, the optical sensor may be expanded to include several pairs of transmitters and receivers in the transmitting/receiving unit. An object can be detected simultaneously at several locations with the aid of the transmitting/receiving light beams of the individual pairs, which are conducted through one or several windows in the housing. That is to say, the monitored area in which an object can be detected is increased in this way.

BRIEF DESCRIPTION OF THE DRAWINGS

These and other features and advantages of the invention will be further understood from the following detailed description with reference to the accompanying drawings.

FIG. 4 shows a first modification of the arrangement shown in FIGS. 2 and 3 for realizing the reference measurement.

FIG. 5 shows a second modification of the arrangement shown in FIGS. 2 and 3 for realizing the reference measurement.

DETAILED DESCRIPTION

Figure 1:
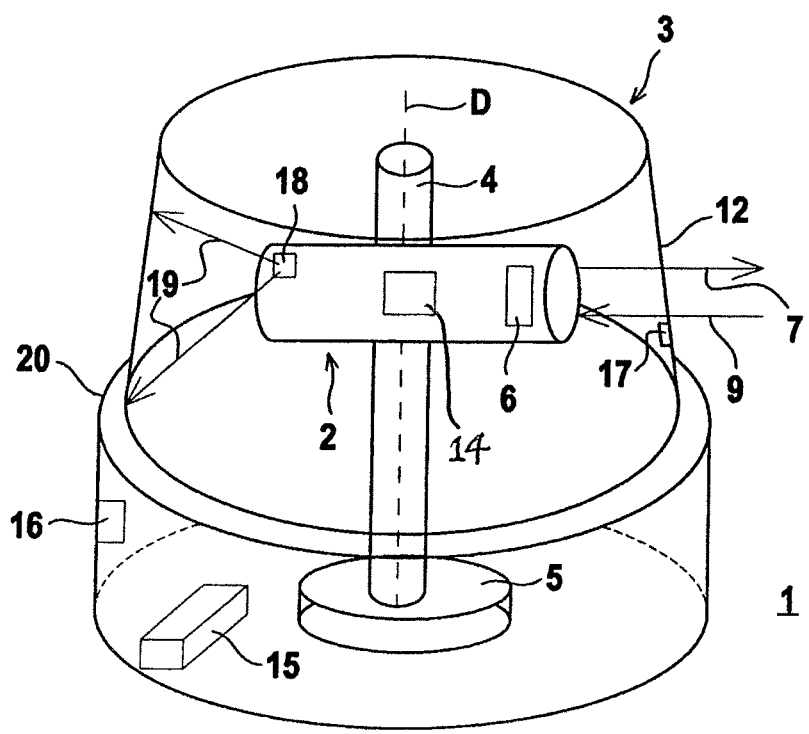
FIG. 1 is a schematic representation of an embodiment of the optical sensor according to the invention.

FIG. 1 schematically illustrates the design of an optical sensor 1 for detecting an object in a monitored area. The optical sensor 1 comprises a measuring head 2 which rotates around an axis D and is arranged inside a stationary, meaning a non-rotating housing 3. The measuring head 2 is positioned on a shaft 4 that extends along an axis of rotation D and is stimulated to rotate by a drive 5. During a detection of the object which is realized with the measuring head 2, the measuring head rotates at a constant speed. A transducer, in particular an angle transmitter (not shown), is used to detect the momentary rotational position of the measuring head 2.

Figure 2:
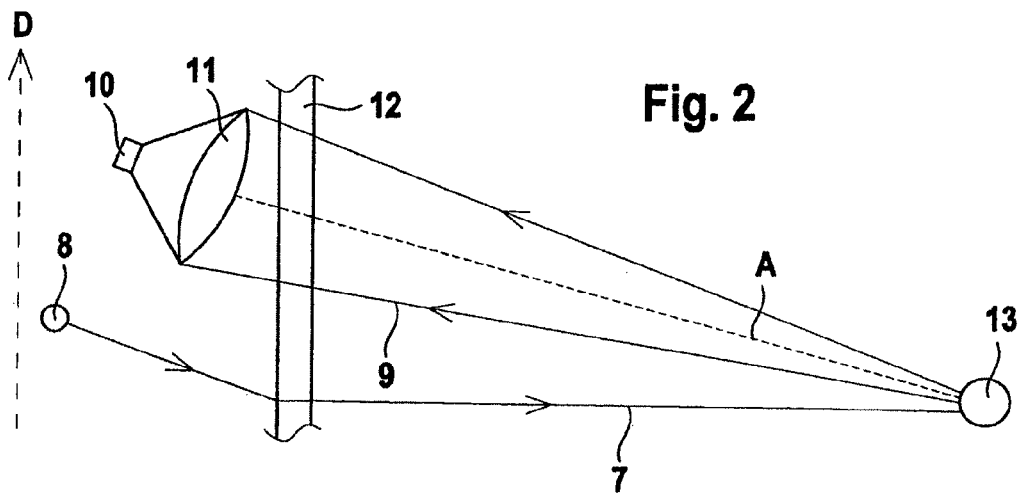
FIG. 2 is a representation of components of the transmitting/receiving unit for the optical sensor according to FIG. 1, during the detection of an object positioned at far range.
Figure 3:
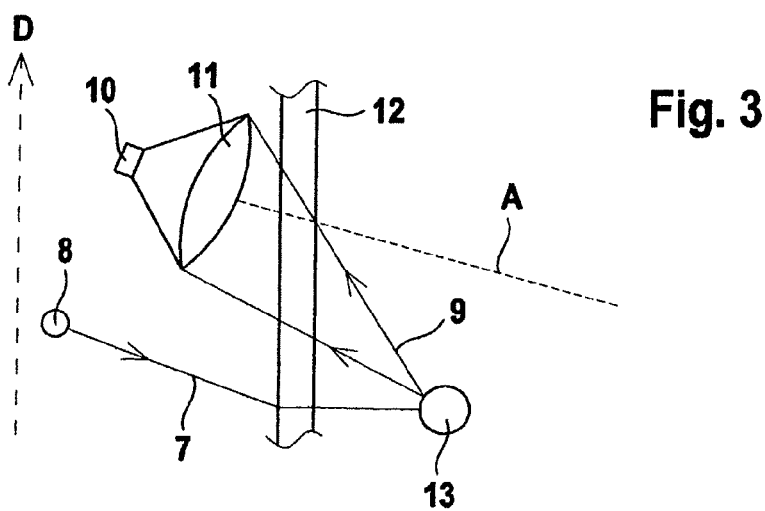
FIG. 3 shows the arrangement according to FIG. 2 during the detection of an object positioned at close range.

Integrated into the measuring head 2 is a transmitting/receiving unit 6 which forms an optical distance sensor element. The individual components of the transmitting/receiving unit 6 are shown in FIGS. 2 and 3.

The transmitting/receiving unit 6 comprises a transmitter 8, for example a laser diode, for emitting light rays 7. A transmitting optics, which is not shown in further detail, can be installed immediately downstream of the laser diode, in the beam direction of the transmitted light rays 7. The transmitting/receiving unit 6 furthermore comprises a receiver 10 for receiving the light rays 9 which may be a photodiode or the like. Installed upstream of the receiver 10 is a receiving optics 11 in the form of a lens, wherein the receiving optics can generally also be embodied as a reflecting optics.

Figure 1A:
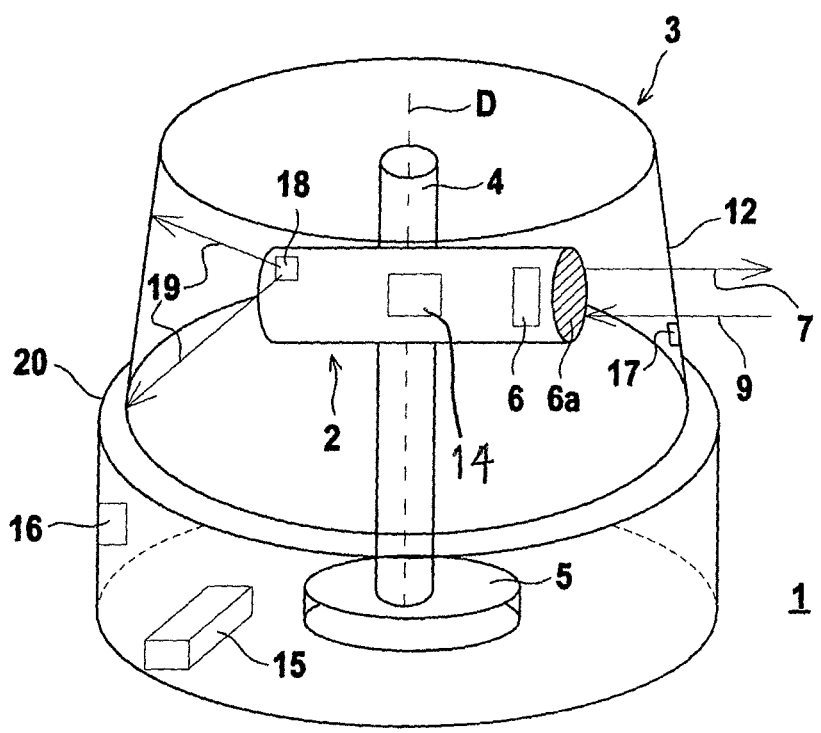
FIG. 1a is a schematic representation of a modification of the embodiment of the optical sensor shown in FIG. 1.

FIG. 1a shows a first variant of the optical sensor according to FIG. 1, for which a transmitting and receiving optics which is embodied as optical component 6a is arranged downstream of the transmitting/receiving unit.

Figure 1B:
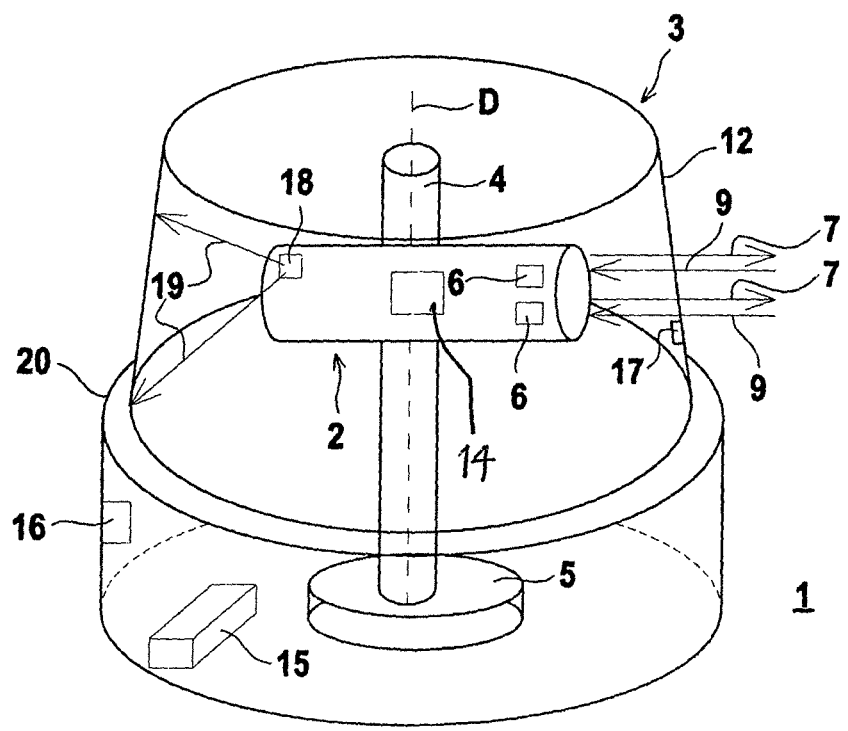
FIG. 1b is a schematic representation of a further modification of the embodiment of the optical sensor shown in FIG. 1.

FIG. 1b shows a second variant of the optical sensor according to FIG. 1 for which two transmitting/receiving units 6 are provided instead of just one such unit.

FIGS. 1 to 3 show that the transmitted light rays 7 and the received light rays 9 are conducted through a section of the housing 3 which forms a window 12. The window 12 extends in a circumferential direction of the housing 3 over the complete angular range of 360°. As a result of the rotational movement of the measuring head 2, the transmitted light rays 7 are periodically guided over the total angular range of 360°, so that this region also forms the monitored region in which an object is detected. Owing to the distance measurement and the simultaneous detection of the momentary rotational position of the measuring head 2, the precise positions of the object can be determined during the object detection.

The transmitting/receiving unit 6 realizes the distance measurements with the aid of the light transit-time method, for which the transmitter 8 emits light rays 7 in the form of transmitted light pulses. The distance is determined by measuring the light-transit times, meaning the respectively required times for a transmitted light pulse to travel to an object 13 and back to the receiver 8. The respective beam paths are shown in FIGS. 2 and 3. The light rays 7 emitted by the transmitter 8 pass through the window 12 and then travel inside the monitored region in which the transmitted light rays 7 are reflected by an object 13 and subsequently travel back in the form of receiving light rays 9 through the window 12 and onto the receiver 10.

FIGS. 2 and 3 show that the transmitter 8 and the receiver 10 of the transmitting/receiving unit 6 are arranged offset in the axial direction, meaning in the direction of the rotational axis D of the measuring head 2. For this, the receiving optics with its optical axis A is arranged so as to be angled slightly in a downward direction.

The transmitter 8 is arranged so that inside the housing 3 the transmitted light rays 7 are also directed downward at a slight angle to prevent undesirable reflections of the transmitted light rays 7 back into the receiver 10 inside the housing 3. The window 12 of the housing 3 functions as a beam-forming element for the transmitted light rays 7, such that the transmitted light rays 7 are deflected to extend perpendicular to the rotational axis in the monitored area, in particular through selecting a suitable form for the window 12 in this area.

In general, undesirable reflections of the transmitted light rays and the received light rays are already prevented in that the measuring head forms a tube, or is provided with a tube, for conducting the transmitted and the received light rays or is provided with two tubes for separately conducting the transmitted and the received light rays. This tube or these tubes can extend up close to the window, thereby avoiding the undesirable reflections.

FIG. 2 illustrates the detection of an object positioned at far range in which the object is positioned approximately in the region of the optical axis A of the receiving optics. Thus, the complete share of the received light rays 9, which are reflected back by the object 13, is conducted via the receiving optics 11 to the receiver 10. As a result, a large share of the received light is conducted onto the receiver 10, even if the object is positioned at far range, thereby resulting in a sufficiently large receiving signal at the output of the receiver 10 to ensure a secure detection of the object.

FIG. 3 illustrates the detection of an object 13 at close range. Owing to the short distance between the object 13 and the measuring head 2, the danger of an overdrive exists for the receiver 10. However, this danger is avoided as a result of the offset arrangement of the transmitter 8 and the receiver 10. As can be seen in FIG. 3, the receiver 10 is subject to a desired loss of adjustment for an object 13 at close range, such that the object 13 is positioned outside of the optical axis for the receiver 10. As a result, only a portion of the received light still travels to the receiver 10, thereby preventing an overdriving of the receiver.

A pre-processing unit 14 which rotates along in the measuring head 2 and an evaluation unit 15 that is arranged stationary inside the housing 3 are used for evaluating the signals generated in the transmitting/receiving unit 6. To meet the requirements for use in the field of personal protection, these units have a two-channel design, in particular taking the form of computer units which cyclically monitor each other.

A contactless data and energy transfer, which is designed to be failsafe when used in the field of safety technology, occurs between the stationary components of the optical sensor 1 on the one hand and the components of the optical sensor 1 that rotate along with the measuring head 2 on the other hand. The contactless data transfer can be realized via an optical path or with the aid of a radio link. The data transfer in particular can take place via the shaft 4 which is embodied as hollow shaft, wherein electrical fields can be used for the contactless energy transfer or the transfer can be inductive. In the process, the energy transfer can occur based on the transformation principle, wherein the degree of effectiveness can be increased with a ferromagnetic core.

For the signal pre-processing in the pre-processing unit 14, interfering signals which are caused by dust or the like are separated from useful signals coming from an object 13 and are eliminated, thereby exploiting the factor that dust particles in the air are detected only by individual transmitting light pulses. In contrast, an object 13 to be detected has much larger dimensions. For example, the minimum object size to be measured in the field of personal safety is defined by the leg of a person. During the detection of such an object 13, several transmitted light pulses impinge on the object 13 within a broad angle of rotation range. Thus, the pre-processing unit 14 can securely differentiate between useful signals and interfering signals among the number of transmitted light pulses which are present during the object detection.

The useful signals only are transmitted from the pre-processing unit 14 to the evaluation unit 15. A switching signal is generated based on this in the evaluation unit 15 and is output via a switching output 16. When used for equipment to safeguard persons, a danger zone of a system is monitored with the optical sensor 1. If no object 13 is detected with the optical sensor 1 and the internal equipment testing determines an error-free function of the optical sensor 1, then a release signal is transmitted via the switching output 16 which starts the operation of the system. On the other hand, if an internal malfunction is detected in the sensor 1, or if an object 13 is detected in the monitored area, a shutdown command is issued via the switching output which then shuts down the system.

As shown in FIG. 1, a reference object 17 may be arranged at a location on the inside of the window 12 for testing the operation of the transmitter/receiver unit 6, wherein this reference object in the present case is a partially transparent grid. With each rotation of the measuring head 2, light rays 7 emitted by the transmitter 8 impinge on the reference object 17, thereby carrying out a reference measurement for testing the operation of the transmitting/receiving unit 6. In the present case, the transmitter 8 and the receiver 10 of the transmitting/receiving unit 6 are used for the reference measurement. If the transmitted light rays 7 impinge on the reference object 17, a share of the transmitted light rays 7 is conducted from the reference object 17 to the receiver 10.

The largest share of the transmitted light rays 7 penetrates the reference object 17 and/or is guided past this reference object and is thus available for detecting an object. With the aid of the difference in the transit times between the light pulses, a differentiation can be made in the pre-processing unit 14 to determine whether a received light pulse comes from the reference object 17 or from the object 13 in the monitored area. The reference measurement is divided into an amplitude measurement and a distance measurement, wherein the respective measuring results are compared to predetermined desired values. An error-free operation of the transmitting/receiving unit 6 exists only if the measured values coincide with the desired values.

FIG. 4 shows a first variant for realizing the reference measurement. Provided in addition to the transmitter 8 is an additional transmitting element 21, wherein the light rays 22 emitted by this element are conducted from the reference object 17 to the receiver.

FIG. 5 shows a second variant for realizing the reference measurement. An additional receiving element 23 is provided in this case to which the light rays are conducted which are emitted by the transmitter and reflected by the reference object Furthermore integrated into the measuring head 2 is a sensor element 18 for monitoring the window. The sensor element 18 comprises an additional transmitting element that emits the light rays 19 and an additional receiving element for receiving the light rays 19, which elements are not separately shown in FIG. 1.

The sensor element 18, which is arranged opposite the transmitting/receiving unit 6 in the measuring head 2, emits the light rays 19 so that these light rays penetrate the window 12 and then impinge on a reflector in the form of a reflector strip 20 which extends in circumferential direction around the outside of the housing 3. The light rays 19, which are reflected back by this strip, again pass through the window 12 and then impinge on the receiving element of the sensor element 18. In the evaluation unit 15, local dirt deposits on the window 12 are detected as a result of weakening of the light rays 19.

It will be understood that the above description of the present invention is susceptible to various modifications, changes and adaptations, and the same are intended to be comprehended within the meaning and range of equivalents of the appended claims.

What is claimed is:

1. An optical sensor apparatus to detect objects within a monitored region, comprising:
a housing including a window;
a sensor including a transmitting/receiving unit arranged inside the housing and being rotatable around an axis, the transmitting/receiving unit comprising a transmitter to emit light rays and a receiver to receive light rays, wherein the transmitted light rays and the received light rays are conducted through the window in the housing, and the window is optically adapted to shape the transmitted light rays and the received light rays into beams.

2. The optical sensor apparatus according to claim 1, wherein the transmitting/receiving unit comprises a distance sensor that operates based on the light transit time method, and wherein the transmitter emits light rays in a form of transmitted light pulses for which the transit time to an object to be detected is recorded.

3. The optical sensor apparatus according claim 1, further including transmitting optics cooperating with the transmitter and receiving optics cooperating with the receiver, wherein at least one of the transmitter and transmitting optics is arranged at an axial offset to at least one of the receiver and the receiving optics.

4. The optical sensor apparatus according to claim 3, wherein at least one of the transmitting optics and the receiving optics comprises a reflecting optics.

5. The optical sensor apparatus according to claim 3, wherein the transmitting optics and the receiving optics comprise a single optical component.

6. The optical sensor apparatus according to claim 1, wherein the monitored region extends over an angular range of 360° or a section of 360°.

7. The optical sensor apparatus according to claim 1, wherein the housing is stationary, and further comprising a rotating measuring head arranged inside the stationary housing, wherein the transmitting/receiving unit is a component of the rotating measuring head.

8. The optical sensor apparatus according to claim 7, further comprising an additional transmitting element to realize the reference measurements, wherein the light rays from the additional transmitting element are conducted from the reference object to the receiver and wherein the additional transmitting element is a component of the measuring head.

9. The optical sensor apparatus according to claim 7, further comprising an additional receiving element to realize the reference measurements, wherein the light rays emitted by the transmitter and reflected back by the reference object are conducted to the additional receiving element and wherein the additional receiving element is a component of the measuring head.

10. The optical sensor apparatus according claim 7, further comprising a sensor element integrated into the measuring head for monitoring the window.

11. The optical sensor apparatus according to claim 10, further comprising a reflector attached to the housing; and wherein the sensor element emits light rays that are conducted through the window and onto the reflector and then travel back from the reflector through the window to the sensor element.

12. The optical sensor apparatus according to claim 7, further comprising electronic components integrated into the measuring head for at least one of control and evaluation of signals from the transmitting/receiving unit.

13. The optical sensor apparatus according to claim 12, wherein the electronic components integrated into the measuring head are for signal processing to suppress error signals.

14. The optical sensor apparatus according to claim 7, further including a stationary component to conduct a secure or a non-secure, contactless energy and/or data communication with the rotating measuring head.

15. The optical sensor apparatus according to claim 1, further comprising a reference object arranged on the window to function as a target for reference measurements to test an operation of the transmitting/receiving unit.

16. The optical sensor apparatus according to claim 15, wherein the reference object is a partially transparent object, wherein a share of the light rays emitted by the transmitter is reflected back to the receiver to realize reference measurements.

17. The optical sensor apparatus according claim 15, wherein the reference measurements comprise an amplitude measurement and a distance measurement.

18. The optical sensor apparatus according to claim 1, wherein the sensor includes a device to visualize the transmitted light rays or the point at which the transmitted light rays impinge on an object.

19. The optical sensor apparatus according to claim 1, wherein the transmitted light rays are divided into a main beam and satellite beams that are uncoupled from the main beam and extend at different angles relative to the main beam.

20. The optical sensor apparatus according to claim 1, wherein the transmitting/receiving unit comprises at least two pairs of transmitters and receivers.

* * * * *